Figure 1:
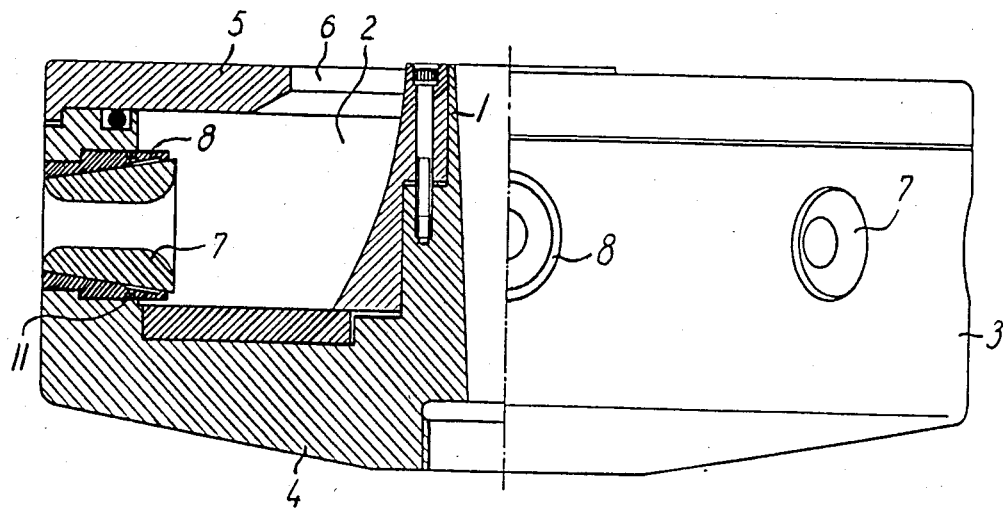

United States Patent [19]

Svarrer

[11] Patent Number: 4,684,065
[45] Date of Patent: Aug. 4, 1987

[54] ATOMIZER WHEEL WITH STEEL BUSHINGS

[75] Inventor: Lauge Svarrer, Hvidovre, Denmark

[73] Assignee: A/S Niro Atomizer, Soborg, Denmark

[21] Appl. No.: 850,306

[22] Filed: Apr. 10, 1986

[30] Foreign Application Priority Data

Apr. 10, 1985 [DK] Denmark ............................ 1607/85

[51] Int. Cl.⁴ ............................................. B05B 3/10
[52] U.S. Cl. ........................................ 239/224; 494/56
[58] Field of Search ............. 239/223, 224, 591, 600; 159/3, 48.1; 494/56

[56] References Cited

U.S. PATENT DOCUMENTS

| | | | |
|---|---|---|---|
| Re. 29,083 | 12/1976 | Nielsen | 239/224 |
| Re. 30,963 | 6/1982 | Moller et al. | 239/224 |
| 2,695,748 | 11/1954 | Millard | 494/56 X |
| 3,887,133 | 6/1975 | Straarup et al. | 239/224 |
| 4,121,770 | 10/1978 | Straarup et al. | 239/224 |
| 4,303,200 | 12/1981 | Hansen | 239/223 |

FOREIGN PATENT DOCUMENTS 2247291  6/1975  France ................................ 239/223

*Primary Examiner*—Andres Kashnikow
*Assistant Examiner*—Mary Beth O. Jones
*Attorney, Agent, or Firm*—Sughrue, Mion, Zinn, Macpeak and Seas

[57] ABSTRACT

The atomizer wheel is provided along the circumference of its external wall (3) with a number of ejection apertures, in which wear-resistant ceramic linings (7) are arranged by means of replaceable steel bushings (8). The steel bushings (8) and/or the linings (7) project somewhat into the annular chamber of the atomizer wheel and the bushings are sealed against the external wall (3) with sealing rings (11). Moreover, each bushing (8) is provided in its inner surface facing the associate lining (7) with a flat recess (13) extending on either side of the inner surface of the external wall (3). Thereby, the steel bushings (8) may be resiliently deformed without transferring excessive stresses to the linings (7).

2 Claims, 2 Drawing Figures

ATOMIZER WHEEL WITH STEEL BUSHINGS

The invention relates to an atomizer wheel for atomizing slurries of a highly abrasive material, comprising a wheel hub and a mainly cylindrical external wall defining an annular chamber of a substantially bowl-like cross-sectional shape coaxially surrounding said hub, a number of substantially horizontal and radial ejection apertures distributed over the circumference of said external wall, a lining of a wear-resistant sintered material being arranged in each of said apertures by means of a repleaceable steel bushing fitting loosely with respect to said external wall, said bushings as well as said linings projecting into said annular chamber.

In such a wheel the arrangement of the sintered linings involves severe difficulties mainly because the lining material is not able to withstand tensile or bending stresses of any significance but only compressive stress. For that reason the linings are often made conical and arranged in corresponding conical bores in the steel bushings, since they will then be exposed to a substantially pure compressive stress when they are pressed hardly outwards into the bores by the centrifugal force during rotation of the wheel.

Since atomizer wheels of the above kind rotate at very high velocities during operation they are exposed to such heavy centrifugal forces that a deformation of the material itself takes places, particularly in the external wall of the wheel. As a result of this deformation a certain original circular cross-sectional shape or an ejection aperture will become slightly elliptical or oval since the length of a diameter extending in a radial plane normal to the rotational axis of the wheel will become longer.

In order to prevent these deformations from being transferred directly through the steel bushings to the sintered linings—resulting in formation of fractures therein—the bushings are, as mentioned, fitting loosely in the wheel, i.e. so that the external diameter of each bushing is slightly smaller than the internal diameter of the ejection aperture.

During atomization of a slurry the bushings are exposed to wear which from time to time may even by very heavy. This wear is restricted, however, to certain well defined areas and for that reason the bushings are preferably mounted so that they can be turned as they are gradually being worn in order to increase their lifetime.

In practice, this may be effected by providing each bushing with a shoulder facing away from the rotational axis of the wheel and engaging an oppositely directed shoulder of corresponding shape in the respective ejection aperture. In order to prevent particles from penetrating into the clearance between an ejection aperture and the associated bushing a sealing ring is mounted in the outer surface of the bushing facing the external wall as close as structurally possible to the inner surface of the wall.

In spite of all these precautions, which are known e.g. from U.S. Pat. No. Re. 30,963, considerable problems of fracture formation in the sintered linings, have appeared to occur, however, particularly in case of larger wheel diameters, e.g. exceeding 350 mms. This is now believed to be related to the fact that a small amount of particles may still be able to penetrate into the horizontal clearance around the structurally inevitable narrow annular area between the recess of the sealing ring and the inner surface of the external wall which clearance increases during the rotation of the atomizer wheel. When the wheel is stopped and the ejection apertures regain their original shape bending stresses and thereby a risk of fracture formation will arise in the sintered linings as a result thereof.

On the other hand, the formation of fractures may as well relate to the wear resisting layer deposited on the inner surface of the atomizer wheel, said layer having a thickness corresponding to the length of the part of the bushing and/or the lining projecting into the annular chamber and consisting of solid particles from the slurry to be atomized. This layer may consequently be both very compact and strong and as it is formed under the rotation of the atomizer wheel—and thus when the wheel is resiliently deformed—the layer will, while the wheel after stopping regains its original shape and diameter, expose the bushings and thus the linings to strong forces acting substantially in a radial plane normal to the rotational axis of the wheel and capable of causing fractures or cracks.

According to the invention an atomizer wheel is provided which is characterized in that a flat recess is formed in the internal side of each bushing facing the lining arranged therin, said recess extending at least through a portion of the length of the bushing projecting into the annular chamber.

By virtue of the clearance thus provided between the bushing and the lining and the reduced wall thickness a bushing formed in this way is able to be resiliently deformed to a smaller diameter without simultaneously transferring inadmissibly strong forces causing a bending moment to the sintered lining.

In principle, the recess must thus extend at least inside the portion of the steel bushing exposed to said harmful forces, i.e. between the recess of the sealing ring and the end of the steel bushing located in the annular chamber. As no particles may be able to penetrate into the recess, it terminates in practice a short distance from the internal end of the bushing. Advantageously, the recess extends in the axial direction of the bushing on either side of the inner surface of said external wall, whereby the bushing becomes more resilient to stresses caused by particles clamped in the space between the steel bushing and the external wall of the atomizer wheel.

In the following, an embodiment of the invention will be explained in greater detail with reference to the drawing, in which FIG. 1 is a partial sectional view of an atomizer wheel according to the invention, and FIG. 2 is a sectional view on a larger scale of a bushing according to the invention.

The atomizer wheel illustrated in FIG. 1 comprises an annular chamber 2 having a substantially bowl-like cross-sectional shape and delimited by a central hub 1, a substantially cylindrical external wall 3, a bottom portion 4 and a cover 5. In the cover 5 an aperture 6 is provided concentrically around the hub 1 through which the slurry to be atomized is supplied to the atomizer wheel.

Along the circumference of the external wall 3 of the atomizer wheel a number of ejection apertures are provided, through which a supplied slurry is ejected outwards in atomized form during operation into a surrounding drying chamber in which the fine particles formed by the atomization are dried so that their content of solids drops down to the bottom of the drying chamber as a fine powder. In order to prevent wear on the atomizer wheel itself steel bushings 8 with wear-resistant linings 7 are inserted in the individual ejection apertures.

Figure 2:
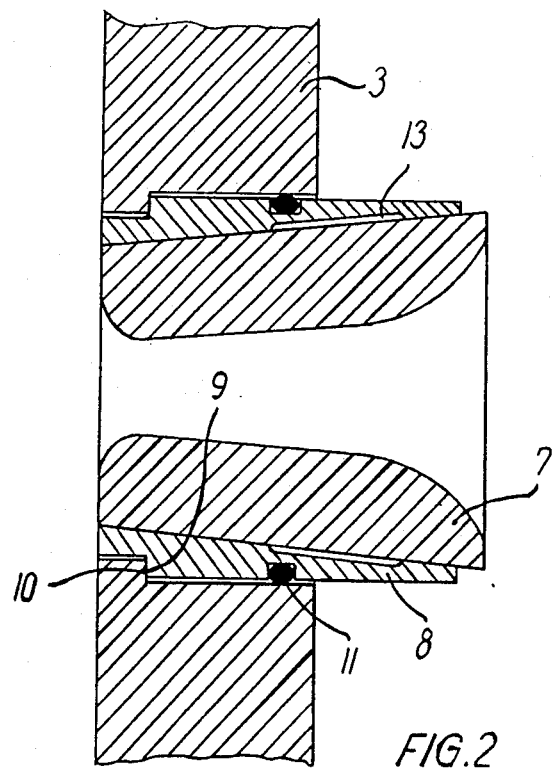

FIG. 2 illustrates a single ejection aperture with an associated bushing 8. The bushing is made from steel and provided with an outwardly directed shoulder 9 abutting against a correspondingly shaped, oppositely directed shoulder 10 in the ejection aperture. As mentioned before the bushing 8 is fitting loosely in the aperture and, in order to prevent particles from penetrating into the clearance thus provided, it is sealed against the external wall 3 by means of a sealing ring 11 arranged near the inner surface of the wall 3. A conical lining 7 of a wear-resistant, preferably ceramic material is inserted in the steel bushing.

To allow elastic deformation of the bushing without transferring excessive stresses to the ceramic lining 7, the bushing 8 is provided with a flat recess 13 in its inner surface facing the lining. In the embodiment shown, the recess 13 extends from below the recess of the sealing ring 11 and close to the internal end of the bushing 8, i.e. substantially throughout that portion of the bushing which in the worst case is exposed to stresses which if transferred directly to the ceramic lining could damage it.

I claim:

1. An atomizer wheel for atomizing slurries of a highly abrasive material, comprising a wheel hub (1) and a mainly cylindrical external wall (3) defining an annular chamber (2) of a substantially bowl-like cross-sectional shape coaxially surrounding said hub (1), a number of substantially horizontal and radial ejection apertures distributed over the circumference of said external wall (3), a lining (7) of a wear-resistant sintered material being arranged in each of said apertures by means of a replaceable steel bushing (8) fitting loosely with respect to said external wall, said bushings (8) as well as said linings (7) projecting into said annular chamber, characterized in that a flat recess (13) is formed in the internal side of each bushing (8) facing the lining (7) arranged therein, said recess extending in the axial direction of the bushing (8) on either side of the inner surface of said external wall (3).

2. An atomizer wheel as claimed in claim 1, characterized in that a sealing ring (11) is arranged between the steel bushing (8) and the external wall (3) close to the inner side of the latter, said recess extending between a position opposite said sealing ring and close to the end of said steel bushing (8) located in said annular chamber.

* * * * *